United States Patent
Damnjanovic et al.

(10) Patent No.: US 9,332,510 B2
(45) Date of Patent: May 3, 2016

(54) APPARATUS AND METHOD FOR CONTROLLING INTER-CELL INTERFERENCE BETWEEN FEMTOCELLS AND MACROCELLS

(75) Inventors: Aleksandar Damnjanovic, Del Mar, CA (US); Madhavan S. Vajapeyam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 446 days.

(21) Appl. No.: 12/858,139

(22) Filed: Aug. 17, 2010

(65) Prior Publication Data
US 2012/0046028 A1  Feb. 23, 2012

(51) Int. Cl.
*H04B 1/00* (2006.01)
*H04W 52/36* (2009.01)
(Continued)

(52) U.S. Cl.
CPC ............ *H04W 52/367* (2013.01); *H04B 17/24* (2015.01); *H04B 17/345* (2015.01); *H04W 24/02* (2013.01); *H04W 52/243* (2013.01); *H04W 84/045* (2013.01)

(58) Field of Classification Search
CPC . H04W 72/082; H04W 84/045; H04W 24/02; H04W 52/146; H04W 52/245; H04W 52/343; H04W 72/0426; H04W 4/00; H04W 52/241; H04W 52/50; H04W 28/18; H04W 48/08; H04W 52/16; H04W 72/1231; H04W 72/1284; H04W 84/18; H04B 7/024; H04B 2201/70702; H04B 7/022; H04B 7/0413; H04B 7/0617; H04B 7/0626; H04L 25/0228; H04L 5/0035; H04L 5/0037; H04L 5/0048; H04L 5/005; H04L 5/0058; H04L 5/0073; H04L 5/0094; H04L 1/0003; H04L 25/03821; H04L 27/2626; H04L 27/364
USPC ............ 455/452.2, 444, 453, 450, 561, 522, 455/436, 446, 114.2, 452.1, 63.1, 447, 62, 455/423, 501, 442, 433, 422.1, 67.13, 428, 455/443; 370/338, 254, 252, 235, 337, 310, 370/329, 345, 331, 333, 232; 375/346, 317, 375/144

See application file for complete search history.

(56) References Cited

U.S. PATENT DOCUMENTS

2004/0127191 A1\* 7/2004 Matsunaga .................... 455/403
2006/0159016 A1\* 7/2006 Sagfors ................... H04L 47/12
370/230

(Continued)

FOREIGN PATENT DOCUMENTS

CN    101132190 A    2/2008
CN    101778483 A    7/2010

(Continued)

OTHER PUBLICATIONS

Naveen A. et al., "Mechanisms to Jointly Ensure QoS of Macrocell and Femtocell by Enabling Power Control in Femtocells," Oct. 16, 2008, pp. 5, Motorola, Inc.

(Continued)

*Primary Examiner* — Golam Sorowar
(74) *Attorney, Agent, or Firm* — François A. Pelaez

(57) ABSTRACT

A method for controlling inter-cell interference may include receiving a measured uplink interference level through a first backhaul link; determining a transmit power level based on the measured uplink interference level; and sending through a second backhaul link the transmit power level for reconfiguring either a user equipment or a femtocell eNodeB. From the downlink perspective, it may include measuring a downlink interference; and reporting the level of the downlink interference to an ICIC server using a backhaul link. In one example, it may include receiving a measured downlink interference through a first backhaul link; determining a transmit power level based on the measured downlink interference; and sending a message comprising the transmit power level to a femtocell eNodeB using a second backhaul link.

24 Claims, 10 Drawing Sheets

(51) Int. Cl.
*H04W 24/02* (2009.01)
*H04W 52/24* (2009.01)
*H04B 17/24* (2015.01)
*H04B 17/345* (2015.01)
*H04W 84/04* (2009.01)

(56) References Cited

U.S. PATENT DOCUMENTS

| | | | |
|---|---|---|---|
| 2008/0233967 | A1 | 9/2008 | Montojo et al. |
| 2009/0040972 | A1 | 2/2009 | Robson et al. |
| 2009/0082026 | A1 | 3/2009 | Yavuz et al. |
| 2009/0086861 | A1* | 4/2009 | Yavuz et al. ............. 375/346 |
| 2009/0191813 | A1 | 7/2009 | Abedi |
| 2009/0196245 | A1 | 8/2009 | Ji |
| 2009/0252099 | A1* | 10/2009 | Black et al. ............. 370/329 |
| 2009/0264077 | A1 | 10/2009 | Damnjanovic |
| 2009/0286496 | A1* | 11/2009 | Yavuz et al. ............. 455/127.1 |
| 2010/0035556 | A1 | 2/2010 | Cai et al. |
| 2010/0087221 | A1* | 4/2010 | Srinivasan et al. ........ 455/522 |
| 2010/0097995 | A1 | 4/2010 | Murphy et al. |
| 2010/0118801 | A1* | 5/2010 | Yavuz et al. ............. 370/329 |
| 2010/0216486 | A1* | 8/2010 | Kwon et al. ............. 455/452.2 |
| 2010/0254344 | A1* | 10/2010 | Wei ................. H04W 16/10 370/330 |
| 2010/0285795 | A1* | 11/2010 | Whinnett ................. 455/424 |

FOREIGN PATENT DOCUMENTS

| | | |
|---|---|---|
| EP | 2180739 A1 | 4/2010 |
| EP | 2207377 A1 | 7/2010 |
| JP | H1075231 A | 3/1998 |
| JP | 2007129405 A | 5/2007 |
| JP | 2010016420 A | 1/2010 |
| JP | 2010062951 A | 3/2010 |
| JP | 2010124462 A | 6/2010 |
| JP | 2012506199 A | 3/2012 |
| KR | 20100048846 A | 5/2010 |
| WO | 2009039439 | 3/2009 |
| WO | WO-2009099843 A1 | 8/2009 |
| WO | 2010050756 A2 | 5/2010 |
| WO | WO2011088465 | 7/2011 |

OTHER PUBLICATIONS

International Search Report and Written Opinion—PCT/US2011/048160—ISA/EPO—Dec. 6, 2011.

* cited by examiner

APPARATUS AND METHOD FOR CONTROLLING INTER-CELL INTERFERENCE BETWEEN FEMTOCELLS AND MACROCELLS

FIELD

This disclosure relates generally to apparatus and methods for controlling cell interference. More particularly, the disclosure relates to controlling inter-cell interference between femtocells and macrocells.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, $3^{rd}$ Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output (SISO), multiple-input single-output (MISO) or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Disclosed is an apparatus and method for controlling inter-cell interference between femtocells and macrocells. According to one aspect, a method for controlling inter-cell interference comprising receiving an association between a femtocell and a macrocell from an inter cell interference coordination (ICIC) server; detecting and measuring uplink interference; and reporting the level of the uplink interference to the ICIC server using a backhaul link.

According to another aspect, an apparatus for controlling inter-cell interference comprising means for receiving an association between a femtocell and a macrocell from an inter cell interference coordination (ICIC) server; means for detecting and measuring uplink interference; and means for reporting the level of the uplink interference to the ICIC server using a backhaul link.

According to another aspect, an apparatus for controlling inter-cell interference comprising a receive (RX) data processor for detecting and measuring uplink interference; and a processor for reporting the level of the uplink interference to an inter cell interference coordination (ICIC) server using a backhaul link and for receiving an association between the femtocell and a macrocell from the ICIC server.

According to another aspect, a computer-readable medium storing a computer program, wherein execution of the computer program is for: receiving an association between a femtocell and a macrocell from an inter cell interference coordination (ICIC) server; detecting and measuring uplink interference; and reporting the level of the uplink interference to the ICIC server using a backhaul link.

According to another aspect, a method for controlling inter-cell interference comprising receiving a measured uplink interference level through a first backhaul link; determining a transmit power level based on the measured uplink interference level; and sending through a second backhaul link the transmit power level for reconfiguring either a user equipment (UE) or a femtocell eNodeB.

According to another aspect, an apparatus for controlling inter-cell interference comprising means for receiving a measured uplink interference level through a first backhaul link; means for determining a transmit power level based on the measured uplink interference level; and means for sending through a second backhaul link the transmit power level for reconfiguring either a user equipment (UE) or a femtocell eNodeB.

According to another aspect, an apparatus for controlling inter-cell interference comprising a processor for determining a transmit power level based on a measured uplink interference level; and a transceiver for receiving the measured uplink interference level through a first backhaul link, and for sending through a second backhaul link the transmit power level for reconfiguring either a user equipment (UE) or a femtocell eNodeB.

According to another aspect, a computer-readable medium storing a computer program, wherein execution of the computer program is for: receiving a measured uplink interference level through a first backhaul link; determining a transmit power level based on the measured uplink interference level; and sending through a second backhaul link the transmit power level for reconfiguring either a user equipment (UE) or a femtocell eNodeB.

According to another aspect, a method for controlling inter-cell interference comprising receiving an association between a femtocell and a macrocell from an inter cell interference coordination (ICIC) server; measuring a downlink interference; and reporting the level of the downlink interference to the ICIC server using a backhaul link.

According to another aspect, an apparatus for controlling inter-cell interference comprising means for receiving an association between a femtocell and a macrocell from an inter cell interference coordination (ICIC) server; means for measuring a downlink interference; and means for reporting the level of the downlink interference to the ICIC server using a backhaul link.

According to another aspect, an apparatus for controlling inter-cell interference comprising a processor for receiving an association between a femtocell and a macrocell from an inter cell interference coordination (ICIC) server and for measuring a downlink interference; and a receive (RX) data processor for reporting the level of the downlink interference to an ICIC server using a backhaul link.

According to another aspect, a computer-readable medium storing a computer program, wherein execution of the computer program is for: receiving an association between a femtocell and a macrocell from an inter cell interference coordination (ICIC) server; measuring a downlink interference associated with the association; and reporting the level of the downlink interference to the ICIC server using a backhaul link.

According to another aspect, a method for controlling inter-cell interference comprising receiving a measured downlink interference through a first backhaul link; determining a transmit power level based on the measured downlink interference; and sending a message comprising the transmit power level to a femtocell eNodeB using a second backhaul link.

According to another aspect, an apparatus for controlling inter-cell interference comprising means for receiving a measured downlink interference through a first backhaul link; means for determining a transmit power level based on the measured downlink interference; and means for sending a message comprising the transmit power level to a femtocell eNodeB using a second backhaul link.

According to another aspect, an apparatus for controlling inter-cell interference comprising a processor for determining a transmit power level based on a measured downlink interference; and a transceiver for receiving the measured downlink interference through a first backhaul link and sending a message comprising the transmit power level to a femtocell eNodeB using a second backhaul link.

According to another aspect, a computer-readable medium storing a computer program, wherein execution of the computer program is for: receiving a measured downlink interference through a first backhaul link; determining a transmit power level based on the measured downlink interference, wherein the transmit power level pertains to a femtocell eNodeB; and sending a message comprising the transmit power level to the femtocell eNodeB using a second backhaul link.

Advantages of the present disclosure include mitigating inter-cell interference in femtocell wireless system to maximize overall capacity or throughput among multiple users and improving spectral efficiency.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
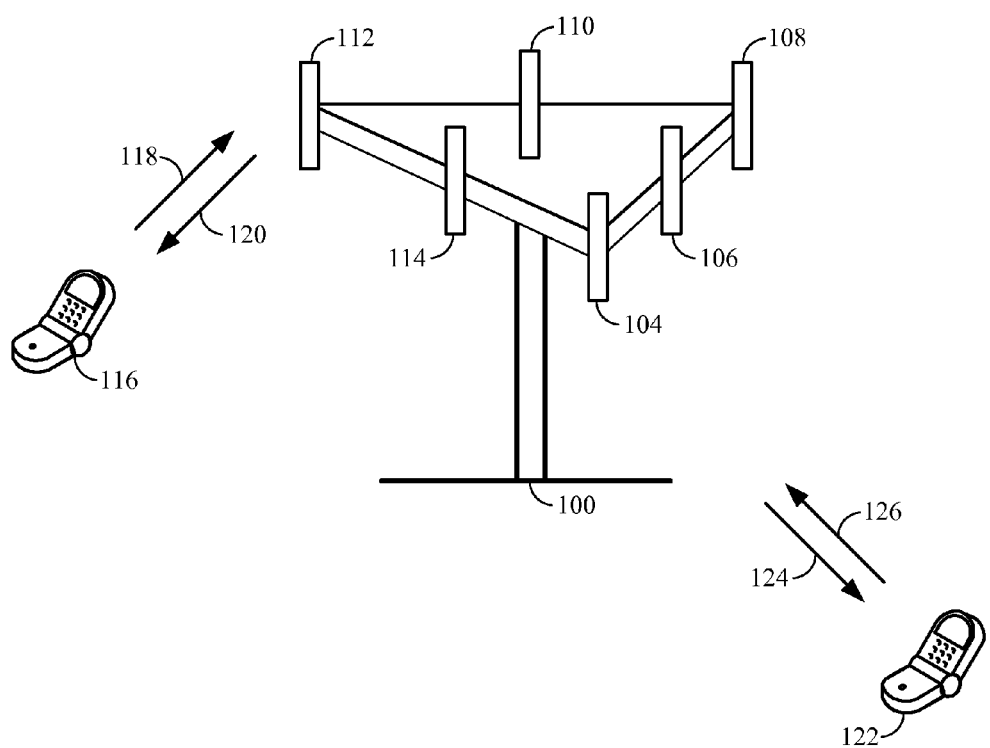
FIG. 1 illustrates an example multiple access wireless communication system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

FIG. 1 illustrates an example multiple access wireless communication system. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a eNode B, or some other terminology. An access terminal may also be called a user equipment (UE), a wireless communication device, terminal, access terminal or some other terminology.

Figure 2:
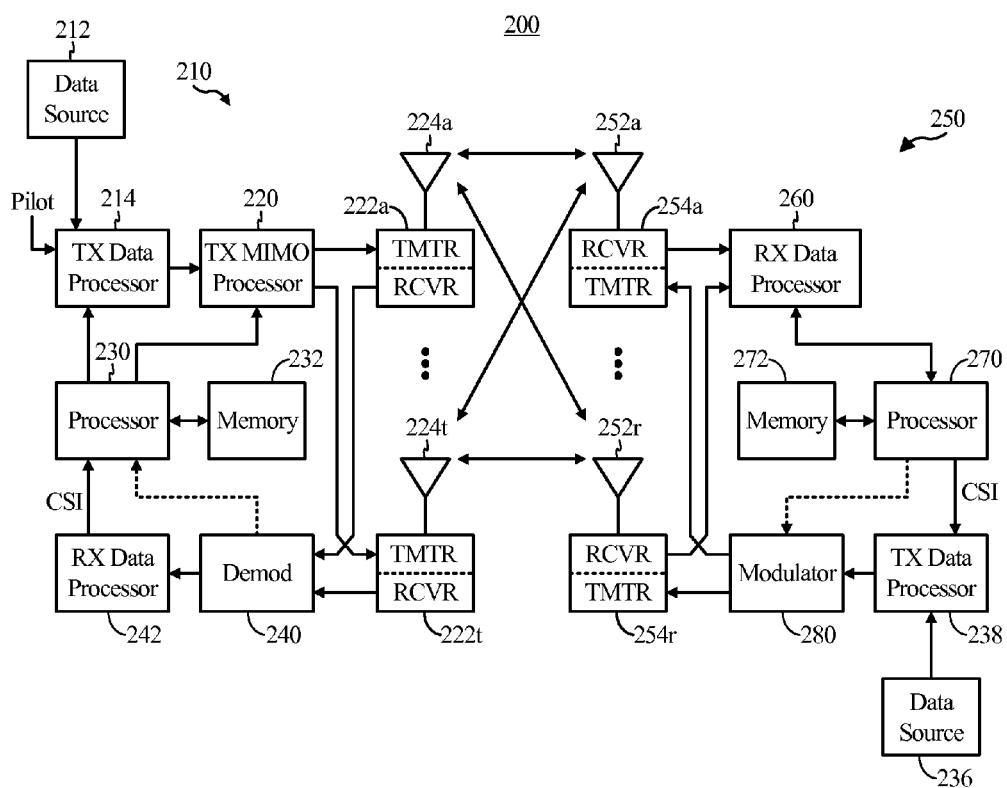
FIG. 2 illustrates an example block diagram of a transmitter system (also known as the access point) and a receiver system (also known as access terminal) in a multiple input multiple output (MIMO) system.

FIG. 2 illustrates an example block diagram of a transmitter system 210 (also known as the access point) and a receiver system 250 (also known as access terminal) in a multiple input multiple output (MIMO) system 200. In one aspect, FIG. 2 applies to a macrocell in which case access point 210 is known as a macro eNodeB and access terminal 250 is also known as a user equipment (UE). In another aspect, FIG. 2 applies to a femtocell in which case access point 210 is known as a home eNodeB and access terminal 250 is also known as a user equipment (UE).

At the transmitter system 210, traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a receive (RX) data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In one aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into downlink (DL) and uplink (UL). DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

In one aspect, the DL PHY channels may comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
In one aspect, the UL PHY Channels may comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)
In one aspect, a channel structure is provided that preserves low peak to average power ratio (PAPR) properties of a single carrier waveform (i.e., at any given time, the channel is contiguous or uniformly spaced in frequency).

Long Term Evolution (LTE) is a next-generation evolution of the Universal Mobile Telecommunications System (UMTS), a worldwide protocol family for wireless communications. LTE provides several new technological features compared to previous wireless technologies including OFDM multicarrier transmission, provisions for multiple antennas for both transmit and receive, and an Internet protocol (IP) packet switching network infrastructure. In particular, OFDM relies on a two-dimensional array of orthogonal time and frequency resources which may be aggregated in many flexible ways to provide a wide variety of user services.

In one aspect, a mobile station or mobile terminal that a user carries for wireless communications is known as user equipment (UE). In general, the UE connects to other users either within the wireless network or the general communications infrastructure such as the public switched telephony network (PSTN), Internet, private networks, wide area networks (WANs), etc. via a wireless bidirectional link to an evolved NodeB (eNodeB), also known generically as a base station, which represents the wireless network access node for the UE. Other wireless network elements separate from the access nodes (e.g. eNodeBs) are considered part of the core network (CN). The eNodeB is connected to other network elements such as the serving gateway (S-GW) and the Mobility Management Entity (MME). In one aspect, the S-GW serves as a mobility anchor for data bearers when the UE moves between different eNodeBs. In another aspect, the MME serves as a control entity for managing the signaling between the UE and the core network (CN). The S-GW interfaces with the packet data network gateway (P-GW), which functions as a LTE portal to the global Internet, for example. The P-GW also allocates IP addresses for the UE and enforces quality of service (QoS) based on policy rules.

In one aspect, the downlink resources in LTE are partitioned into smaller elemental time and frequency resources. For example, in the time dimension, a radio frame has 10 ms duration and is divided into ten subframes, each of 1 ms duration. Furthermore, each subframe is divided into two 0.5 ms slots. In the case of a normal cyclic prefix length, each slot comprises seven OFDM symbols. In the frequency dimension, a Resource Block (RB) is a group of 12 subcarriers each with a subcarrier bandwidth of 15 kHz. A subcarrier is also denoted as a tone, for example. One Resource Element (RE) is the smallest resource unit in LTE which consists of one subcarrier and one OFDM symbol.

In another aspect, certain Resource Blocks are dedicated for special signals such as synchronization signals, reference signals, control signals and broadcast system information. For example, three essential synchronization steps in LTE may be necessary: symbol timing acquisition, carrier frequency synchronization, and sampling clock synchronization. In one example, LTE relies on two special synchronization signals for each cell: the Primary Synchronization Signal (PSS) and the Secondary Synchronization Signal (SSS) which are used for time and frequency synchronization and for broadcasting of certain system parameters such as cell identification, cyclic prefix length, duplex method, etc. In general, the PSS is detected by the UE first, followed by SSS detection.

In one aspect, the PSS is based on a Zadoff-Chu sequence, a constant amplitude chirp-like digital sequence. In general, the PSS is detected non-coherently (i.e., detection without phase information) by the UE since there is assumed to be no a priori channel information available by the UE. In another aspect, the SSS is based on a maximal length sequence (also known as M-sequence). Since the detection of the SSS is performed after the detection of the PSS, if channel state information (CSI) is available to the UE after PSS detection, then coherent detection (i.e., detection with phase information) of the SSS may be available. In certain scenarios, however, non-coherent detection of the SSS may be required, for example, in the case of coherent interference from neighboring eNodeBs.

Figure 3:
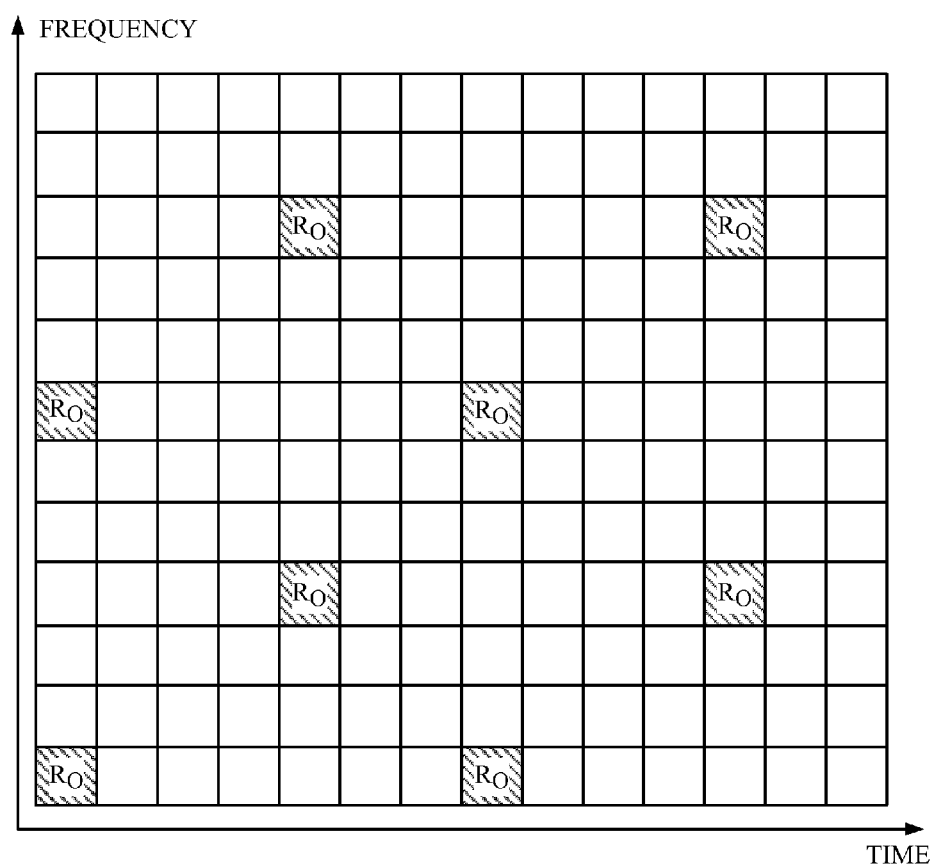
FIG. 3 illustrates an example cell-specific RS arrangement with a normal cyclic prefix (CP) length.

In another aspect, after PSS and SSS detection has been accomplished, for the case of new cell identification, the UE acquires and tracks certain Reference Signals (RS) from the LTE downlink. The LTE downlink, in one example, may contain three unique RS types as follows:

Cell-specific RSs, broadcast to all UEs within a cell
UE-specific RSs, intended only for certain UEs
MBSFN-specific RSs, intended only for Multimedia Broadcast Single Frequency Network (MBSFN) operation In one aspect, the LTE downlink provides RSs within certain locations within an OFDM time-frequency lattice. For example, FIG. 3 illustrates an example cell-specific RS arrangement with a normal cyclic prefix (CP) length. As shown, the RS symbols are shown staggered in the time dimension and frequency dimension according to the expected channel coherence bandwidth and maximum Doppler spread, respectively.

In another aspect, each RS is comprised of quaternary phase shift keyed (QPSK) modulation using a length-31 Gold sequence for good cross-correlation properties. The cell-specific RS also contains a cell identification field and a cell-specific frequency shift to mitigate interference from adjacent cells.

LTE-Advanced (LTE-A) is a proposed next generation wireless technology evolution to the UMTS protocol family. Desired goals for LTE-A systems include enhanced data rates, for example, up to 1 Gb/s on the downlink. In addition, deployment of LTE-A wireless systems must be backward-compatible with LTE systems to preserve the financial investments made in the preceding LTE infrastructure. Furthermore, another goal for LTE-A systems is improved spectral efficiency, that is, a higher data throughput per unit bandwidth, expressed in bits per second per Hertz (bps/Hz). Improved spectral efficiency is vital to the growth of the wireless communication industry since the available spectral resources for wireless transmission are severely limited and tightly regulated worldwide.

In one aspect, an extension to current wireless systems, for example, LTE, for controlling inter-cell interference between macrocells and femtocells is disclosed. Macrocells cover a relatively large area, on the order of 1000 m radius, whereas femtocells cover a relatively small area, on the order of 10 m radius, such as a home or small business. In general, there will be many femtocells contained within a macrocell.

For example, in LTE there is little interference within a cell (intra-cell) due to the usage of orthogonal frequencies for different users in the same cell. However, interference may be dominated by inter-cell interference (between different cells). In one example, previous solutions to the interference problem have included a 1 bit "overload indicator" (OI) to designate the presence of high interference in the uplink which may be used as a simple threshold indicator to reduce transmit power. Also, inter cell interference coordination (ICIC) is a scheduling strategy to limit inter cell interference. This disclosure describes additional backhaul (i.e. not using user links) signaling through the self organizing network (SON)/ICIC server to provide two inter cell interference solutions:

Uplink: control the maximum power (P_max) of UE in a femtocell (i.e. closed subscriber group (CSC) cell) by the SON/ICIC server Downlink: limit the maximum femtocell (CSG cell) eNodeB transmit power by the SON/ICIC server.

In one example, macro UEs in a closed subscriber group (CSG) cell neighborhood may jam a base station of a CSG cell. In one aspect, CSG UEs may significantly interfere with a macro wireless network on the uplink side.

Figure 4:
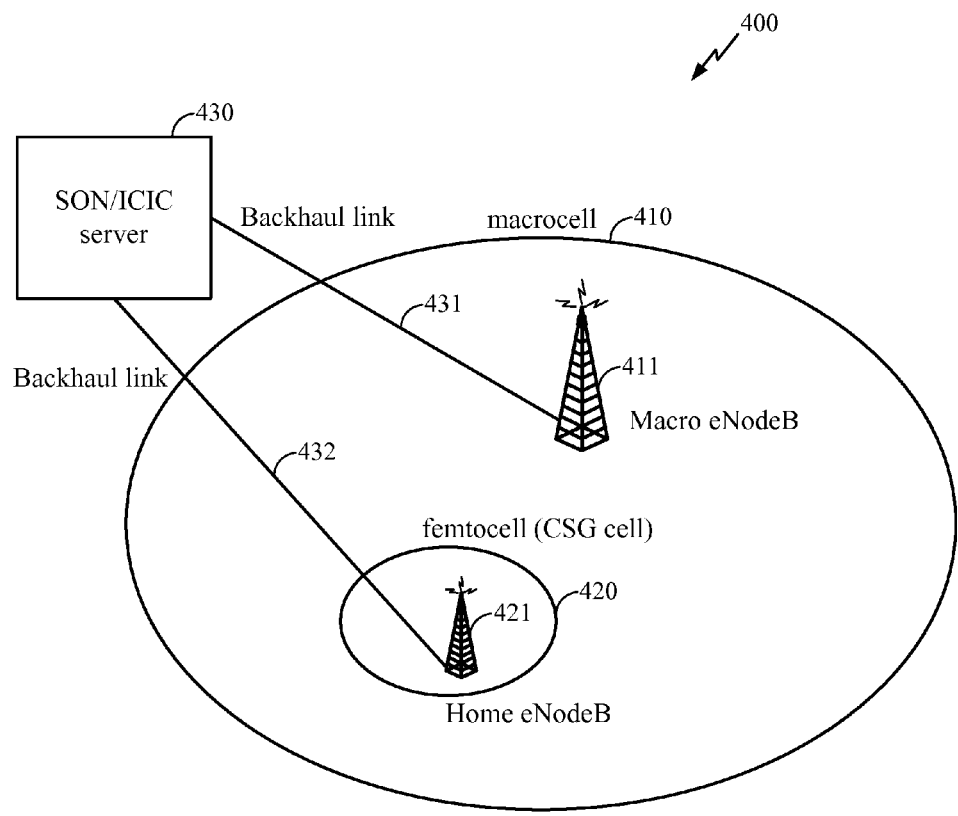
FIG. 4 illustrates an example wireless system architecture with a femtocell (CSG cell) contained within the coverage area of a macrocell.

FIG. 4 illustrates an example wireless system architecture 400 with a femtocell (CSG cell) 420 contained within the coverage area of a macrocell 410. In one example, the femtocell 420 is comprised of a femtocell home eNodeB 421 to transmit femtocell downlink signals and to receive femtocell uplink signals from UEs within the femtocell 420. In another example, the macrocell 410 is comprised of a macro eNodeB 411 to transmit macrocell downlink signals and to receive macrocell uplink signals from UEs within the macrocell 410. In one aspect the femtocell home eNodeB 421 and the macro eNodeB 411 are connected to a SON/ICIC server 430 via backhaul links 431, 432. In one example, backhaul links 431, 432 are communication paths which interconnect various parts of the communications infrastructure with the exception of the final (wireless) links to and from the UEs. In one aspect, FIG. 4 applies to a LTE system. Although not shown explicitly, the macro eNodeB could be implemented as a MIMO system with multiple transmit and receive antennas.

Figure 5:
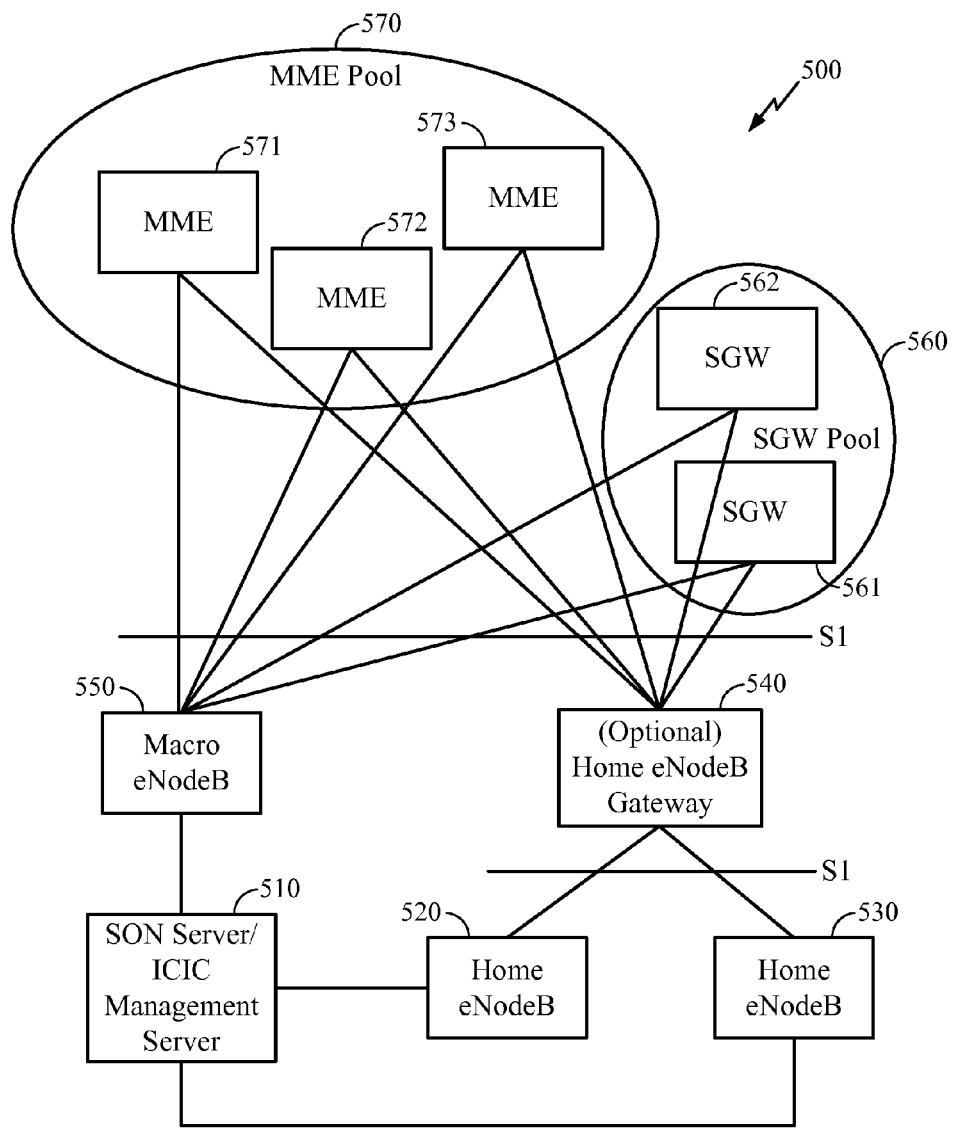
FIG. 5 illustrates an example wireless system architecture which includes a home eNodeB gateway for scalability.

FIG. 5 illustrates an example wireless system architecture 500 which includes a home eNodeB gateway 540 for scalability. In one example a SON/ICIC server 510 is connected to a macro eNodeB 550 as well as home eNodeBs 520, 530. In one aspect, this architecture will work for any scenario where SON/ICIC servers are connected to macro and home eNodeBs. In one example, based on UE measurements, the SON/ICIC server associates home eNodeBs with macro cells. In one aspect, the SON/ICIC server 510 provides interference management services for a macrocell covered by the macro eNodeB 550 as well as for femtocells covered by home eNodeBs 520, 530. The home eNodeBs 520, 530 are optionally connected to the home eNodeB gateway 540 to aggregate management service for the femtocells. In addition, the macro eNodeB 550 is connected to a mobility management entity (MME) pool 570. In one example, the MME pool 570 comprises a plurality of mobility management entities (MMES) 571, 572, 573. Similarly, the home eNodeB gateway 540 is connected to a serving gateway (SGW) pool 560. In one example, the SGW pool 560 comprises a plurality of serving gateways (SGWs) 561, 562. In one example, the macro eNodeB 550 is implemented as a MIMO system with multiple transmit and receive antennas.

In one aspect, for an uplink interference scenario, if there are no UEs in a CSG cell, there is no interference issue. To allow a successful initial access, the CSG cell could dynamically bias an open loop power control algorithm to balance the effect of high interference. On the other hand, if there are UEs in a CSG cell, then we need to perform inter cell interference coordination (ICIC) with the macro cell. In one example, frequency ICIC is feasible for both synchronous and asynchronous deployments. In another example, time ICIC is feasible in synchronous deployments. For example, asynchronous deployments require UE feedback. In one aspect, the existing uplink solution employs bandwidth partitioning through a self optimized network (SON) where the macro network and home cells do not use the same band, for example, by using fractional frequency reuse (FFR).

In one example, an improved uplink interference solution may be based on a maximum power control from a SON/ICIC server. For example, each CSG cell is associated with one or several macro cells. In one example, the association is based on UE measurements and data at the SON/ICIC server. The uplink interference level in the macro cells may be reported to the SON/ICIC server. Based on the uplink interference level, the SON/ICIC server may reconfigure the maximum UE transmit power for CSG cells. For example, the parameter P_max, which is transmitted in SIB-1 to limit UE transmit power in a given cell, may be changed to cope with interference in the macro cells.

In another aspect, for a downlink interference scenario, adaptive downlink power control may be employed to provide interference management for femtocells. For example, partial co-channel deployment of CSG cells in a macro network may be used. For example, with a partially jammed downlink in a macro network, partial co-channel deployment may allow macro UEs to communicate.

In one example, an improved downlink interference solution may be employed. For example, in addition to existing mechanisms, we may introduce a maximum CSG eNodeB transmit power limit from the SON/ICIC server. In one example, each CSG cell is associated with one or more macro cells and an association is based on UE measurements and data at the SON server. In another example, the downlink interference in the macro cells may be reported to the SON/ICIC server. For example, based on the downlink/uplink interference level, the SON/ICIC server may reconfigure the maximum eNodeB transmit power for CSG cells. This step effectively reduces coverage of CSG cells, forcing CSG UEs to move closer to the CSG eNodeB thus increasing the path loss difference towards the interfering macro cell.

In one example, the improved uplink and downlink interference solutions may impact the appropriate wireless standards in the following way. For example, backhaul signaling between the macro cells, the SON/ICIC server and CSG cells may be required to facilitate configuration and reconfiguration of the parameter UE P_max in CSG cells and the CSG eNodeB maximum transmit power.

Figure 6:
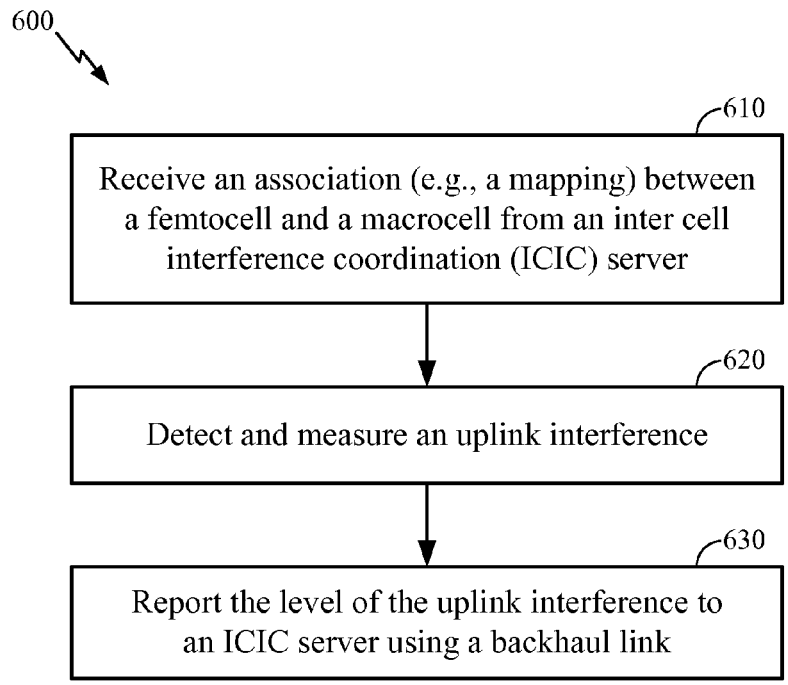
FIG. 6 illustrates an example flow diagram for controlling uplink interference using backhaul signaling from an eNodeB in a macrocell viewpoint.

FIG. 6 illustrates an example flow diagram 600 for controlling uplink interference using backhaul signaling from an eNodeB in a macrocell viewpoint. In block 610, receive an association (e.g., a mapping) between a femtocell and a macrocell from an inter cell interference coordination (ICIC) server. In block 620, detect and measure an uplink interference. In one example, the uplink interference is from a user equipment. And, in one example, the user equipment resides within the femtocell. Following block 620, in block 630, report the level of the uplink interference to an ICIC server using a backhaul link. In one example, the ICIC server reconfigures the maximum transmit power of the user equipment based on the uplink interference.

Figure 7:
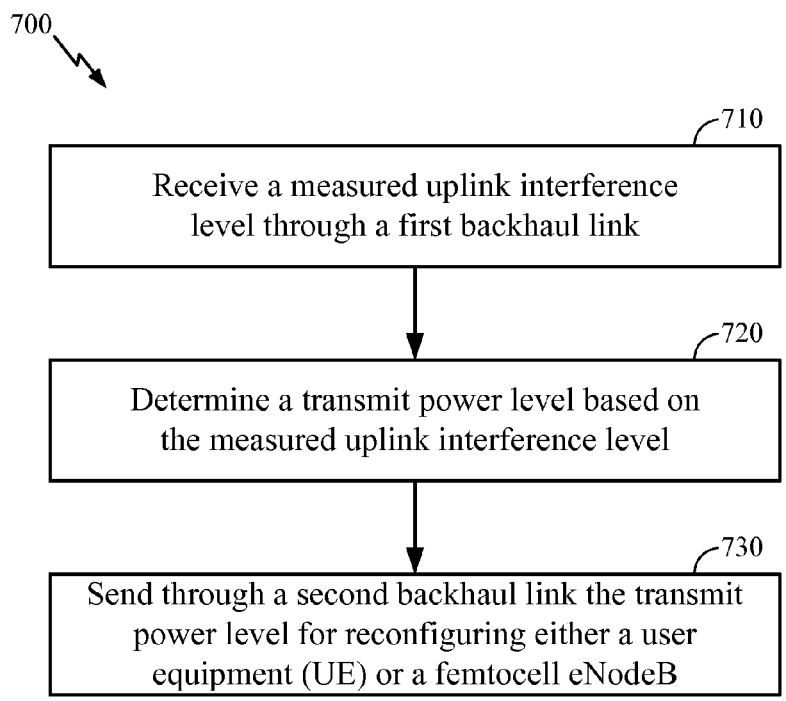
FIG. 7 illustrates an example flow diagram for controlling uplink interference using backhaul signaling from an inter cell interference coordination (ICIC) server viewpoint.

FIG. 7 illustrates an example flow diagram 700 for controlling uplink interference using backhaul signaling from an inter cell interference coordination (ICIC) server viewpoint. In block 710, receive a measured uplink interference level through a first backhaul link. In one example, the measured uplink interference is measured at an eNodeB of a macrocell. In block 720, determine a transmit power level based on the measured uplink interference level. Following block 720, in block 730, send through a second backhaul link the transmit power level for reconfiguring a user equipment (UE). In one example, the transmit power level is sent to a femtocell. And, in one example, the user equipment (UE) is located within the coverage of the femtocell. In another example, the ICIC server reconfigures the maximum transmit power of the femtocell eNodeB based on the uplink interference.

Figure 8:
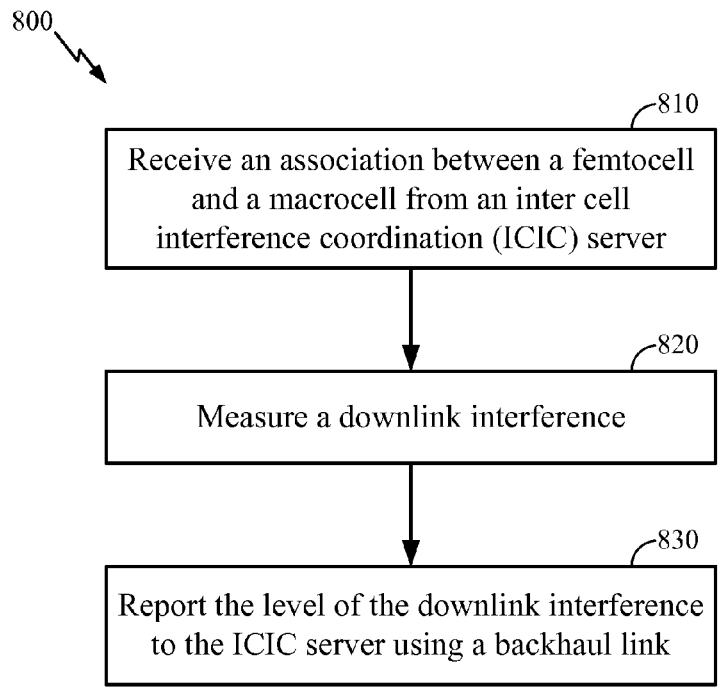
FIG. 8 illustrates an example flow diagram for controlling downlink interference using backhaul signaling from a user equipment (UE) in a Macrocell viewpoint.

FIG. 8 illustrates an example flow diagram 800 for controlling downlink interference using backhaul signaling from a user equipment (UE) in a Macrocell viewpoint. In block 810, receive an association between a femtocell and a macrocell from an inter cell interference coordination (ICIC) server. In block 820, measure a downlink interference. In one example, the downlink interference is from a femtocell eNodeB residing within the femtocell. Following block 820, in block 830, report the level of the downlink interference to the ICIC server using a backhaul link. In one example, the ICIC server reconfigures the maximum transmit power of the femtocell eNodeB based on the downlink interference.

Figure 9:
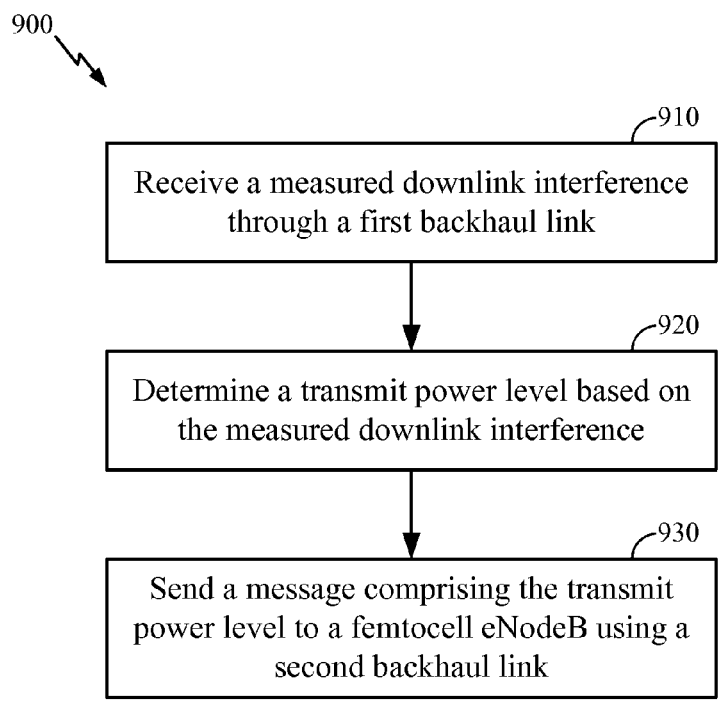
FIG. 9 illustrates an example flow diagram for controlling downlink interference using backhaul signaling from an inter cell interference coordination (ICIC) server viewpoint.

FIG. 9 illustrates an example flow diagram 900 for controlling downlink interference using backhaul signaling from an inter cell interference coordination (ICIC) server viewpoint. In block 910, receive a measured downlink interference through a first backhaul link. Following block 910, in block 920, determine a transmit power level based on the measured downlink interference. In block 930, send a message comprising the transmit power level to a femtocell eNodeB using a second backhaul link. In one example, the transmit power level pertains to the femtocell eNodeB.

One skilled in the art would understand that the steps disclosed in the example flow diagrams in FIGS. 6-9 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 10:
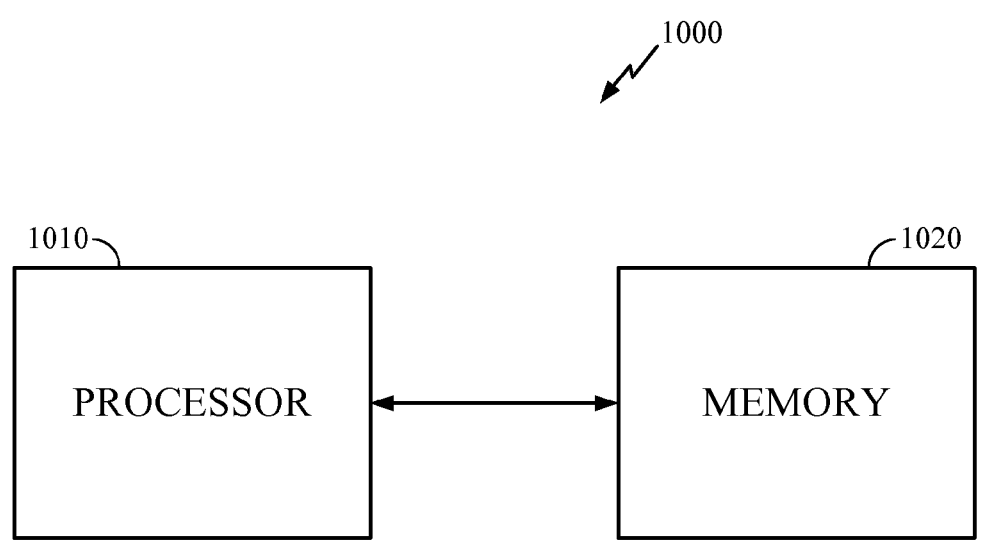
FIG. 10 illustrates an example of a device comprising a processor in communication with a memory for executing the processes for controlling interference.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 10 illustrates an example of a device 1000 comprising a processor 1010 in communication with a memory 1020 for executing the processes for controlling interference. In one example, the device 1000 is used to implement one or more of the algorithms illustrated in FIGS. 6-9. In one aspect, the memory 1020 is located within the processor 1010. In another aspect, the memory 1020 is external to the processor 1010. In one aspect, the processor includes circuitry for implementing or performing the various flow diagrams, logical blocks and/or modules described herein.

Figure 11:
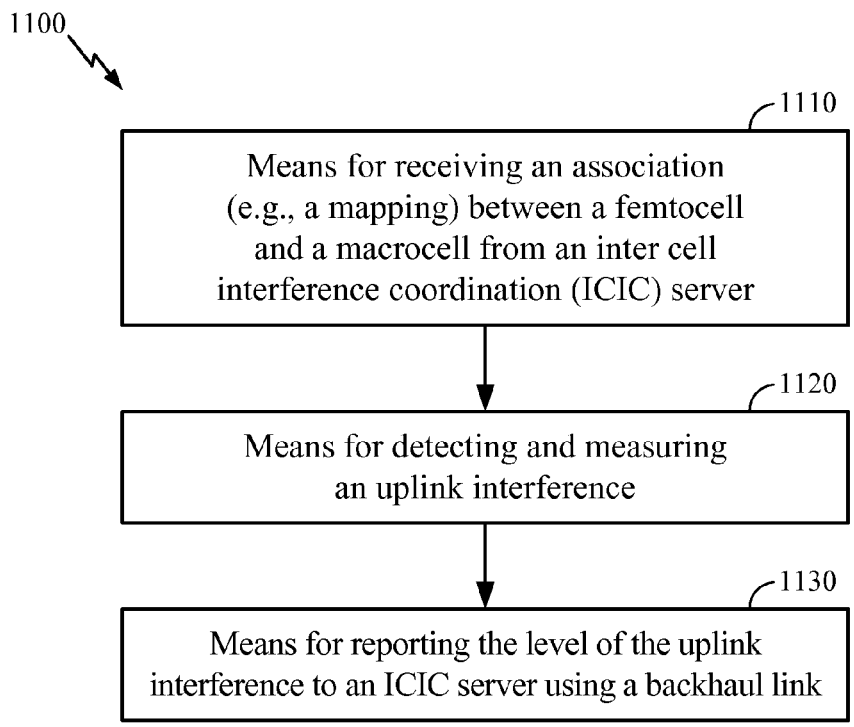
FIG. 11 illustrates an example of a device suitable for controlling uplink interference using backhaul signaling from an eNodeB in a macrocell viewpoint.

FIG. 11 illustrates an example of a device 1100 suitable for controlling uplink interference using backhaul signaling from an eNodeB in a macrocell viewpoint. In one aspect, the device 1100 is implemented by at least one processor comprising one or more modules configured to provide different aspects of controlling uplink interference using backhaul signaling from an eNodeB in a macrocell viewpoint as described herein in blocks 1110, 1120 and 1130. For example, each module comprises hardware, firmware, software, or any combination thereof. In one aspect, the device 1100 is also implemented by at least one memory in communication with the at least one processor.

Figure 12:
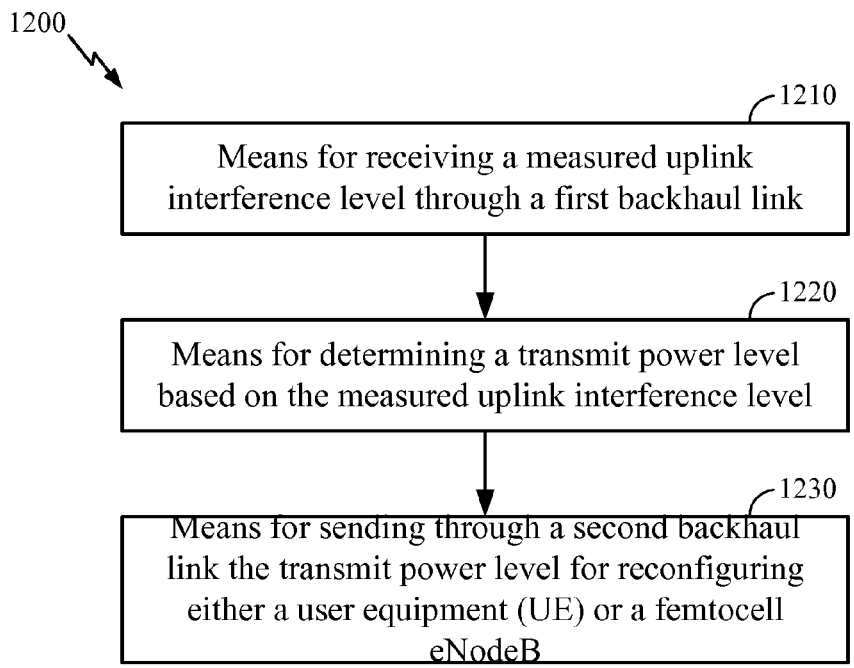
FIG. 12 illustrates an example of a device suitable for controlling uplink interference using backhaul signaling from an inter cell interference coordination (ICIC) server viewpoint.

FIG. 12 illustrates an example of a device 1200 suitable for controlling uplink interference using backhaul signaling from an inter cell interference coordination (ICIC) server viewpoint. In one aspect, the device 1200 is implemented by at least one processor comprising one or more modules configured to provide different aspects of controlling uplink interference using backhaul signaling from an inter cell interference coordination (ICIC) server viewpoint as described herein in blocks 1210, 1220 and 1230. For example, each module comprises hardware, firmware, software, or any combination thereof. In one aspect, the device 1200 is also implemented by at least one memory in communication with the at least one processor.

Figure 13:
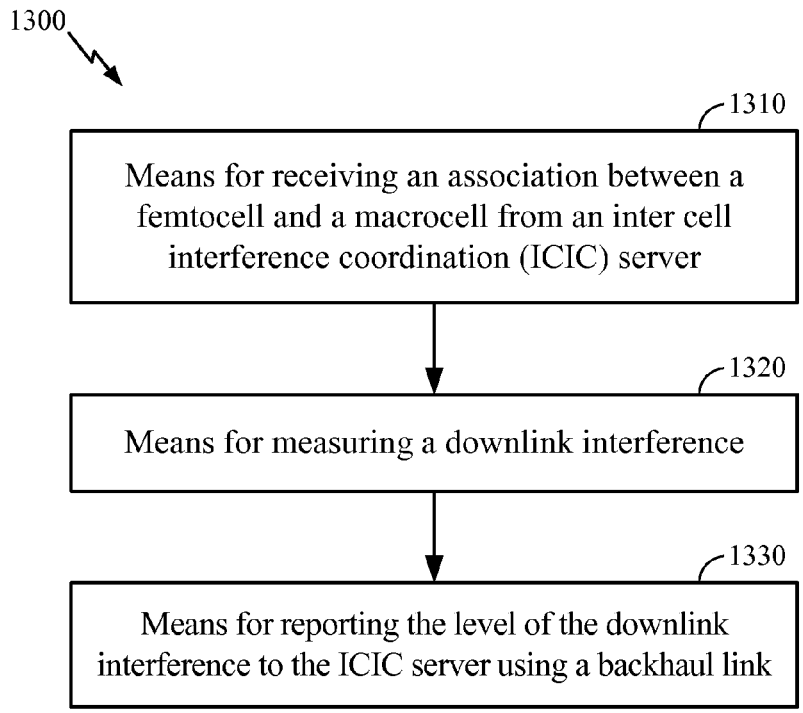
FIG. 13 illustrates an example of a device suitable for controlling downlink interference using backhaul signaling from a user equipment (UE) in a Macrocell viewpoint.

FIG. 13 illustrates an example of a device 1300 suitable for controlling downlink interference using backhaul signaling from a user equipment (UE) in a Macrocell viewpoint. In one aspect, the device 1300 is implemented by at least one processor comprising one or more modules configured to provide different aspects of controlling downlink interference using backhaul signaling from a user equipment (UE) in a Macrocell viewpoint as described herein in blocks 1310, 1320 and 1330. For example, each module comprises hardware, firmware, software, or any combination thereof. In one aspect, the device 1300 is also implemented by at least one memory in communication with the at least one processor.

Figure 14:
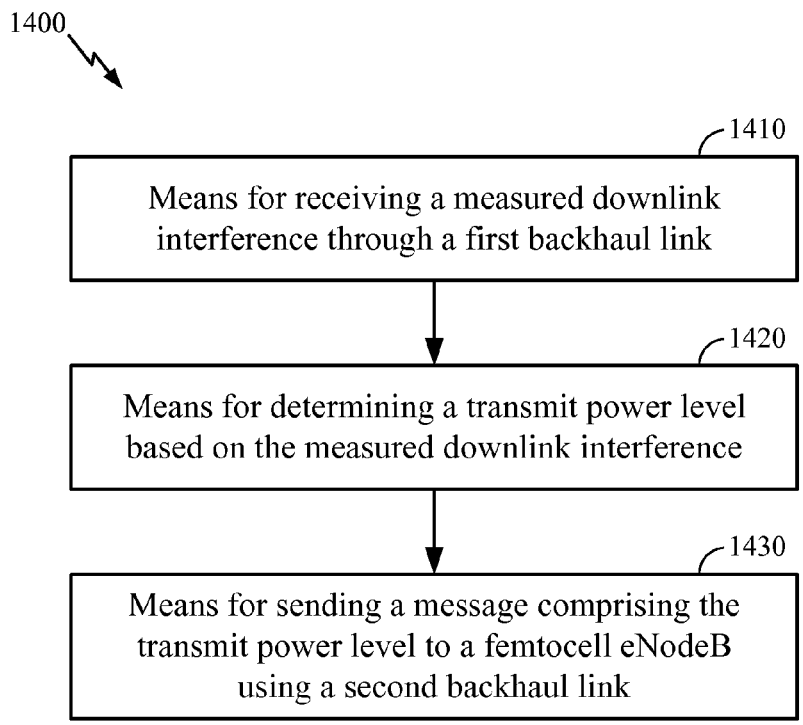
FIG. 14 illustrates an example of a device suitable for controlling downlink interference using backhaul signaling from an inter cell interference coordination (ICIC) server viewpoint.

FIG. 14 illustrates an example of a device 1400 suitable for controlling downlink interference using backhaul signaling from an inter cell interference coordination (ICIC) server viewpoint. In one aspect, the device 1400 is implemented by at least one processor comprising one or more modules configured to provide different aspects of controlling downlink interference using backhaul signaling from an inter cell interference coordination (ICIC) server viewpoint as described herein in blocks 1410, 1420 and 1430. For example, each module comprises hardware, firmware, software, or any combination thereof. In one aspect, the device 1400 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for controlling inter-cell interference comprising:
    receiving, at a macro eNodeB, a mapping that is an association between a macrocell and a femtocell, wherein the mapping is received from an inter cell interference coordination (ICIC) server, and wherein the association between the macrocell and the femtocell is made by the ICIC server based on user equipment measurements at the ICIC server;
    detecting and measuring, after receiving the mapping from the ICIC server, a level of uplink interference from a user equipment within the femtocell; and
    reporting the level of the uplink interference to the ICIC server using a backhaul link.

2. The method of claim 1, wherein the ICIC server reconfigures a maximum transmit power of a user equipment based on the uplink interference.

3. An apparatus for controlling inter-cell interference comprising:
    means for receiving, at a macro eNodeB, a mapping that is an association between a macrocell and a femtocell, wherein the mapping is received from an inter cell interference coordination (ICIC) server, and wherein the association between the macrocell and the femtocell is made by the ICIC server based on user equipment measurements at the ICIC server;
    means for detecting and measuring, after receiving the mapping from the ICIC server, a level of uplink interference from a user equipment within the femtocell; and
    means for reporting the level of the uplink interference to the ICIC server using a backhaul link.

4. The apparatus of claim 3, wherein the ICIC server reconfigures a maximum transmit power of a user equipment based on the uplink interference.

5. An apparatus for controlling inter-cell interference comprising:
- a receiver for receiving, at a macro eNodeB, a mapping that is an association between a macrocell and a femtocell, wherein the mapping is received from an inter cell interference coordination (ICIC) server, and wherein the association between the macrocell and the femtocell is made by the ICIC server based on user equipment measurements at the ICIC server;
- a receive (RX) data processor for detecting and measuring, after receiving the mapping from the ICIC server, a level of uplink interference from a user equipment within the femtocell; and
- a processor for reporting the level of the uplink interference to the ICIC server using a backhaul link.

6. The apparatus of claim 5, wherein the ICIC server reconfigures a maximum transmit power of a user equipment based on the uplink interference.

7. A non-transitory computer-readable medium storing a computer program, wherein execution of the computer program is for:
- receiving, at a macro eNodeB, a mapping that is an association between a macrocell and a femtocell, wherein the mapping is received from an inter cell interference coordination (ICIC) server, and wherein the association between the macrocell and the femtocell is made by the ICIC server based on user equipment measurements at the ICIC server;
- detecting and measuring, after receiving the mapping from the ICIC server, a level of uplink interference from a user equipment within the femtocell; and
- reporting the level of the uplink interference to the ICIC server using a backhaul link.

8. The computer-readable medium of claim 7, wherein the ICIC server reconfigures a maximum transmit power of a user equipment based on the uplink interference.

9. A method for controlling inter-cell interference comprising:
- sending, to a macro eNodeB, a mapping that is an association between a macrocell and a femtocell;
- receiving a measured uplink interference level through a first backhaul link;
- determining, by an inter-cell interference coordination (ICIC) server, a maximum transmit power level for a user equipment (UE), the maximum transmit power level being based on the measured uplink interference level; and
- sending through a second backhaul link, after sending the mapping to the macro eNodeB, the maximum transmit power level for reconfiguring the user equipment (UE).

10. The method of claim 9 wherein the measured uplink interference is measured at the macro eNodeB.

11. The method of claim 9 wherein the maximum transmit power level is sent to the femtocell eNodeB.

12. The method of claim 11 wherein the user equipment (UE) is located within a coverage area of the femtocell eNodeB.

13. The method of claim 9, wherein the ICIC server determines the maximum transmit power level for the femtocell eNodeB.

14. An inter-cell interference coordination (ICIC) server, comprising:
- means for sending, to a macro eNodeB, a mapping that is an association between a macrocell and a femtocell;
- means for receiving a measured uplink interference level through a first backhaul link;
- means for determining, by the ICIC server, a maximum transmit power level for a user equipment (UE), the maximum transmit power level being based on the measured uplink interference level; and
- means for sending through a second backhaul link, after sending the mapping to the macro eNodeB, the maximum transmit power level for reconfiguring the user equipment (UE).

15. The apparatus of claim 14 wherein the measured uplink interference is measured at the macro eNodeB.

16. The apparatus of claim 14 wherein the maximum transmit power level is sent to the femtocell eNodeB.

17. The apparatus of claim 16 wherein the user equipment (UE) is located within a coverage area of the femtocell eNodeB.

18. An inter-cell interference coordination (ICIC) server, comprising:
- a processor for determining, by the ICIC server, a maximum transmit power level for a user equipment (UE), the maximum transmit power level being based on a measured uplink interference level; and
- a transceiver for sending, to a macro eNodeB, a mapping that is an association between a macrocell and a femtocell, for receiving the measured uplink interference level through a first backhaul link, and for sending through a second backhaul link, after sending the mapping to the macro eNodeB, the maximum transmit power level for reconfiguring the user equipment (UE).

19. The apparatus of claim 18 wherein the measured uplink interference is measured at the macro eNodeB.

20. The apparatus of claim 18 wherein the maximum transmit power level is sent to the femtocell eNodeB.

21. The apparatus of claim 20 wherein the user equipment (UE) is located within a coverage area of the femtocell eNodeB.

22. A non-transitory computer-readable medium storing a computer program, wherein execution of the computer program causes an inter-cell interference coordination (ICIC) server to:
- send, to a macro eNodeB, a mapping that is an association between a macrocell and a femtocell;
- receive a measured uplink interference level through a first backhaul link;
- determine, by the ICIC server, a maximum transmit power level for a user equipment (UE), the maximum transmit power level being based on the measured uplink interference level; and
- send through a second backhaul link, after sending the mapping to the macro eNodeB, the maximum transmit power level for reconfiguring the user equipment (UE).

23. The computer-readable medium of claim 22 wherein the measured uplink interference is measured at the macro eNodeB.

24. The computer-readable medium of claim 22 wherein the maximum transmit power level is sent to the femtocell eNodeB and the user equipment (UE) is located within a coverage area of the femtocell eNodeB.

* * * * *